June 20, 1950  T. E. LARKIN  2,512,342
ELECTRIC MOTOR STARTING SYSTEM
Filed Aug. 2, 1948
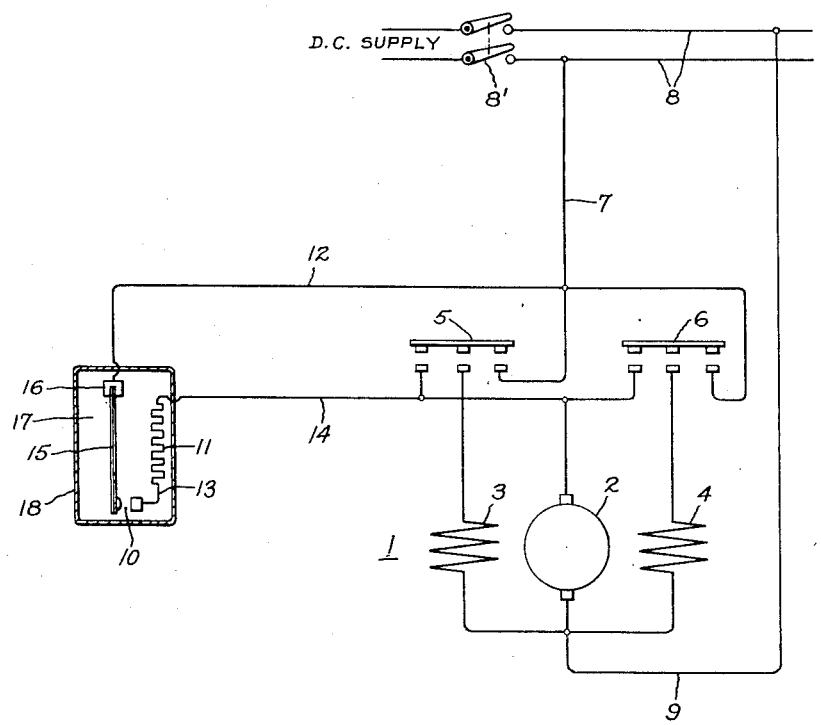
Inventor:
Thomas E. Larkin,
by  *Claude A. Mott*
His Attorney.

Patented June 20, 1950

2,512,342

UNITED STATES PATENT OFFICE 2,512,342

ELECTRIC MOTOR STARTING SYSTEM

Thomas E. Larkin, Schenectady, N. Y., assignor to General Electric Company, a corporation of New York Application August 2, 1948, Serial No. 42,032

3 Claims. (Cl. 318—558)

My invention relates to the starting of electric motors, particularly to fractional horsepower motors, and has for its object the provision of means for preheating motor armatures to aid starting in extreme cold weather.

Motors for aircraft, armament and the like are mounted in exposed positions and are required to be able to function with as much precision in starting at temperatures as low as −65° Fahrenheit as at ordinary temperatures. Small motors, standard for such purposes at ordinary temperatures, operate erratically when starting under low temperature conditions because of added mechanical resistance to starting due to increased viscosity of bearing oil, decreased bearing clearances from unequal contractions of dissimilar materials and other attendant causes although once started, even at such low atmospheric temperatures, they are capable of the required precise performance.

Increased sizes of these motors would furnish the starting torques necessary to overcome this added mechanical resistance, but the resulting increase in inertia of the armatures would impair the required quick braking characteristics of such motors.

Since this increased mechanical resistance, due to low temperatures, affects the motor performance at starting alone, it is necessary to raise the temperature of the motor armatures and bearings at starting only in order to put the motor in the desired operating condition. My invention accomplishes this heating by allowing line current to heat the motor armature before the motor starting switches are closed.

In carrying out my invention, a current limiting resistor and a normally open switch operated by an ambient temperature responsive thermal means are connected in series between the power supply switch and the motor armature of a motor connected to a power supply through a starting switch and a power supply switch. The thermal means distorts to close the normally open switch, completing the circuit when atmospheric temperature falls below a predetermined value. Closing the power supply switch with starting switches open allows current to flow through the armature to raise its temperature to that of normal operation.

The cold start motor switch is rendered ineffective by the closing of the starting switch since they are parallel connected and closing of the starting switch provides the current with a path of less resistance.

For a more complete understanding of my invention, reference is had to the accompanying drawing, the single figure of which is a diagrammatic illustration of a control system for a motor embodying one form of my invention.

Referring to the drawing, a parallel wound reversible motor 1 has an armature 2, a field 3 for operation in one direction and a field 4 for reverse operation. Starting switches 5 and 6, respectively, control operation of the motor in the opposite directions by connecting one side of the motor armature and one side of a field in parallel through the conductor 7 to one side of a D.-C. supply 8, supplied with a power supply switch 8'. The conductor 9 connects the opposite sides of the armature and both fields with the other side of the D.-C. supply. In a grounded system, this latter connection would be grounded. Preferably, the switches 5 and 6 are actuated by solenoids (not shown).

In accordance with my invention, a normally open switch 10, a temperature responsive bimetallic strip 15 and a current limiting resistor 11 are connected in series between the bus 8 and the armature 2 through the conductors 12, 13 and 14.

To determine the value of resistor 11 for each type of motor, a variable resistor is substituted for fixed resistor 11. With the switch 10 held closed in ambient temperature of 70° Fahrenheit, the minimum resistance that will keep the motor temperature from rising above the rated maximum temperature of that type of motor is determined for fixed resistor 11.

The bimetallic strip supplied is of such a value as to distort to close the normally open switch when, due to ambient air temperature, the temperature of the bimetallic strip falls to a predetermined low value such as −15° Fahrenheit, and to return to its normal position to reopen the switch when its temperature rises to a predetermined value, such as 0° Fahrenheit.

The temperature sensitive thermal means is supplied to insure that the armature will not be heated in conditions of air temperatures above the predetermined low value.

The bimetallic strip is secured at 16 to a base 17 and carries one contact of the normally open switch 10 of which the other contact is secured to the base 17. The bimetallic strip 15 and the resistor 11 are enclosed by a dust-proof cover 18 (shown in section) to protect them from physical damage. The rise in temperature within cover 18 due to heating of resistor 11 is negligible compared with changes in atmospheric temperature.

The bimetallic strip distorts in response to the predetermined low atmospheric temperature which is approximately the lower limit of normal operation of fractional horsepower motors. Closing the power switch 8', with the starting switches 5 and 6 remaining open, allows current from the D.-C. supply 8 to flow through conductors 7 and 12, through the bimetallic strip 15, through the closed switch 10, the resistor 11, the conductor 14, the armature 2, and the conductor 9 back to the power supply 8. This current flowing in the armature heats the armature to a normal operating temperature, thus eliminating the added mechanical resistance to starting due to cold weather and putting the motor in condition to start and carry its load in a normal manner as soon as the starting switches are closed.

Various types of motors which operated efficiently at normal temperatures were connected with a cold start motor switch embodying my invention and subjected to an ambient temperature of —65° Fahrenheit. It was found that the heating time required varied from a few seconds to nine minutes, in each case less than ten minutes, to heat the motor to a normal operating temperature.

The thermal means may be mounted inside the motor housing so that it can receive heat from the armature to effect a saving in energy since the thermal means would then open the switch when heated to its predetermined opening temperature instead of maintaining the circuit closed for continued heating.

What I claim as new and desire to secure by Letters Patent of the United States is:

1. In a starting system for an electric motor having an armature and a field winding electrically connected to electric power supply connections through a starting switch, means for overcoming the increased resistance to starting at a low temperature of said electric motor comprising an ambient temperature responsive device arranged to be mounted remote from said motor and electrically connected in cooperative relation with said starting switch, said device comprising a switch means, a resistor means in series electric circuit with said switch means, a thermo-responsive element engaging said switch means, and electric connections for connecting said switch means and resistor means to said power supply connections in shunt relation to said starting switch and in electric series circuit with said armature, said thermo-responsive element being arranged to actuate said switch means to closed position in response to a predetermined low ambient temperature when said starting switch means is open whereby said armature is heated and to open said switch means at a higher predetermined ambient temperature.

2. In a starting system for an electric motor having an armature and a field winding electrically connected through a starting switch to electric power supply connections, means for overcoming the increased resistance to starting of said electric motor at low ambient temperatures comprising an ambient temperature responsive device arranged for mounting remote from said motor and electrically connected in cooperative relation with said starting switch, said device comprising a switch means and a current limiting resistor means connected in electrical series circuit between said armature and said power supply connections and in electric shunt circuit with said starting switch to cause current to flow from said power supply connections to said armature when said switch means is closed and said starting switch is open, and an ambient temperature thermo-responsive element engaging said switch means to close said switch means at a first predetermined ambient temperature and to open said switch means at a second predetermined ambient temperature higher than said first temperature, said current limiting resistor being of suitable resistance value depending upon the rating of said motor to limit the temperature rise of said motor resulting from current supplied to said armature through said resistor to a desired predetermined maximum temperature.

3. In a starting system for an electric motor provided with an armature and a field winding electrically connected to electric power supply connections through a starting switch, that improvement comprising an ambient temperature responsive device arranged for mounting remote from said motor and electrically connected in cooperative relation with said starting switch, said device comprising a thermo-responsive element, a switch means and a current limiting resistor means electrically connected in series electrical circuit between said power supply connections and said armature and in shunt relation to said starting switch, said thermo-responsive element engaging said switch means to close the same to energize said armature in response to a low ambient temperature when said starting switch is open whereby said armature is heated to overcome the increased resistance to starting of an electric motor at low temperatures, and to open said switch means at a higher predetermined ambient temperature to interrupt the flow of current through said device to said armature, said current limiting resistor being of a value dependent upon the rating of said motor to keep the motor temperature from rising above its rated maximum temperature.

THOMAS E. LARKIN.

REFERENCES CITED

The following references are of record in the file of this patent:

UNITED STATES PATENTS

| Number | Name | Date |
| --- | --- | --- |
| 2,027,576 | Chandler | Jan. 14, 1936 |
| 2,069,516 | Baker | Feb. 2, 1937 |
| 2,307,168 | Smelie | Jan. 5, 1943 |

OTHER REFERENCES

"Electrical World," Jan. 10, 1942, page 90, McGraw-Hill Publishing Company.